United States Patent [19]
Leighton et al.

[11] Patent Number: 4,879,747
[45] Date of Patent: Nov. 7, 1989

[54] METHOD AND SYSTEM FOR PERSONAL IDENTIFICATION

[76] Inventors: Frank T. Leighton, 965 Dedham St., Newton Center, Mass. 02159; Silvio Micali, 224 Upland Rd., Cambridge, Mass. 02140

[21] Appl. No.: 170,734

[22] Filed: Mar. 21, 1988

[51] Int. Cl.⁴ .............................................. H04K 1/00
[52] U.S. Cl. ........................................ 380/23; 380/24; 380/25; 380/30; 235/379; 235/380; 235/382; 364/409
[58] Field of Search ............................... 235/379–382, 235/382.5; 380/23–25, 30; 364/409

[56] References Cited

U.S. PATENT DOCUMENTS

| | | | |
|---|---|---|---|
| 3,154,761 | 10/1964 | O'Gorman | 235/380 |
| 3,383,657 | 5/1968 | Claassen et al. | 235/380 X |
| 3,569,619 | 3/1971 | Simjian | 235/380 |
| 3,576,537 | 4/1971 | Ernst | 235/380 |
| 3,581,282 | 5/1971 | Altman | 235/380 X |
| 3,764,742 | 10/1973 | Abbott et al. | 380/23 |
| 3,896,266 | 7/1975 | Waterbury | 235/380 |
| 4,138,058 | 2/1979 | Atalla | 235/380 |
| 4,140,272 | 2/1979 | Atalla | 235/380 |
| 4,281,215 | 7/1981 | Atalla | 235/380 X |
| 4,315,101 | 2/1982 | Atalla | 235/379 X |
| 4,438,824 | 3/1984 | Mueller-Schloer | 380/23 |
| 4,453,074 | 6/1984 | Weinstein | 235/380 |
| 4,501,957 | 2/1985 | Perlman et al. | 235/379 |
| 4,529,870 | 7/1985 | Chaum | 235/380 |
| 4,590,470 | 5/1986 | Koenig | 380/23 |
| 4,634,808 | 1/1987 | Moerder | 380/29 |
| 4,636,622 | 1/1987 | Clark | 235/380 |
| 4,712,103 | 12/1987 | Gotanda | 235/382 X |
| 4,729,128 | 3/1988 | Grimes et al. | 235/380 X |
| 4,731,841 | 3/1988 | Rosen et al. | 380/23 |

OTHER PUBLICATIONS

IBM Technical Disclosure Bulletin-One-Time Pad Digital Signature Technique, M. Wegman, vol. 21, No. 3, Aug. 1978.

Primary Examiner—Stephen C. Buczinski
Assistant Examiner—Bernarr Earl Gregory
Attorney, Agent, or Firm—David H. Judson

[57] ABSTRACT

The method and system of the invention utilizes a private key of a public-key cryptosystem key pair to encrypt a non-secret password into a digital signature. The password and the digital signature are then encoded and stored on a magnetic stripe or other memory device of the card. To effect a transaction, the digital signature on a received card must be shown to have been generated from the password on the received card. The password preferably includes a digitized photograph of the authorized cardholder which is capable of being displayed at the transaction terminal. This enables the operator of the terminal to verify the identity of the cardholder by visual inspection.

26 Claims, 3 Drawing Sheets

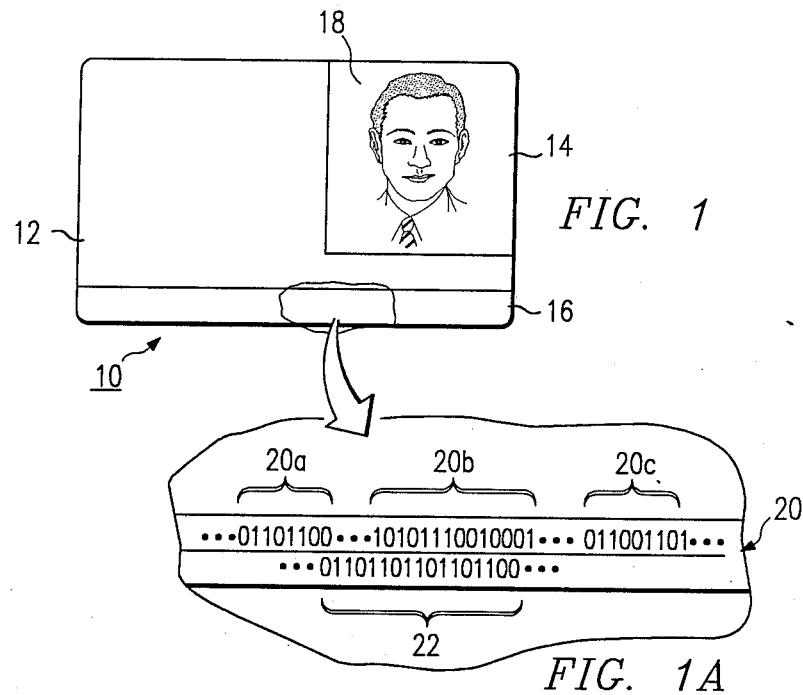
FIG. 1
FIG. 1A
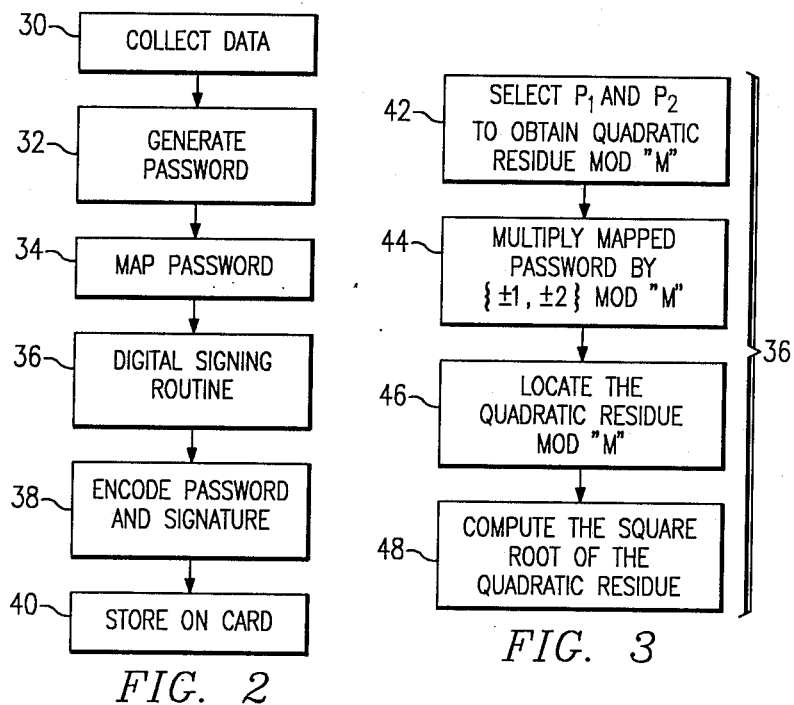
FIG. 2
FIG. 3

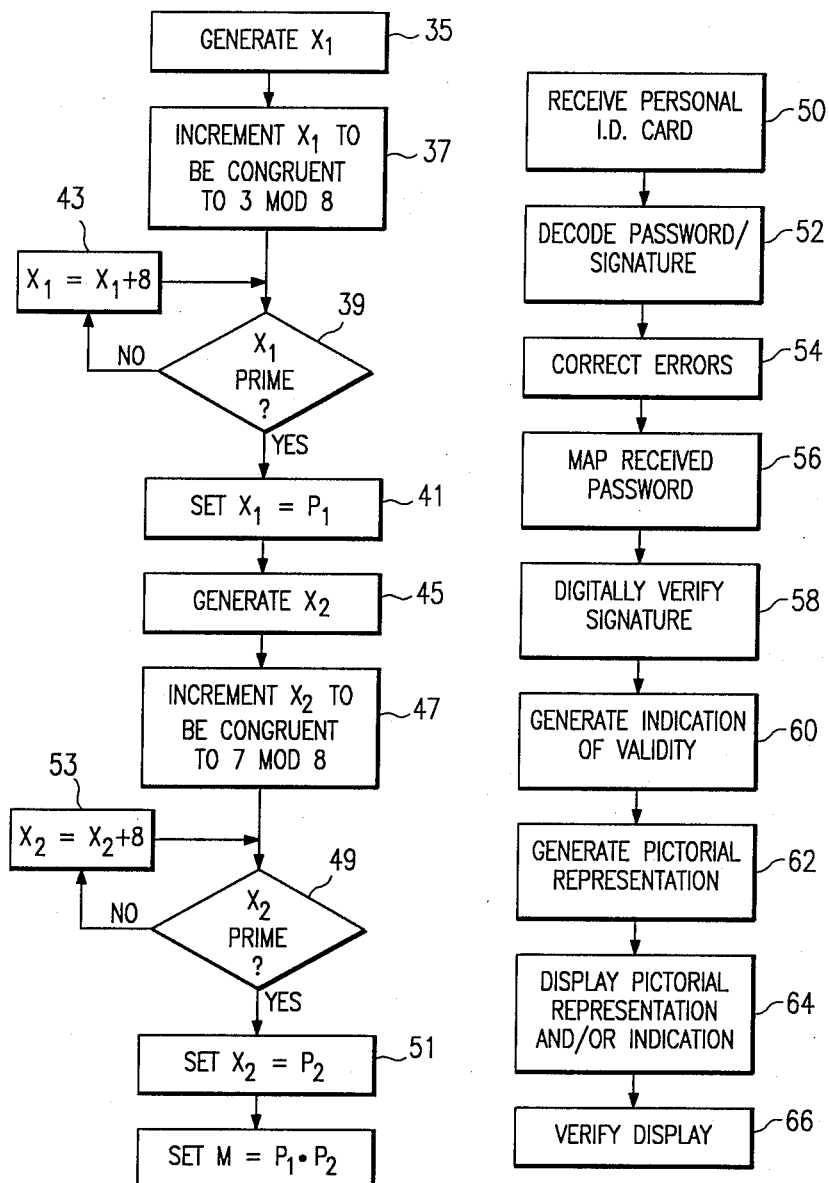

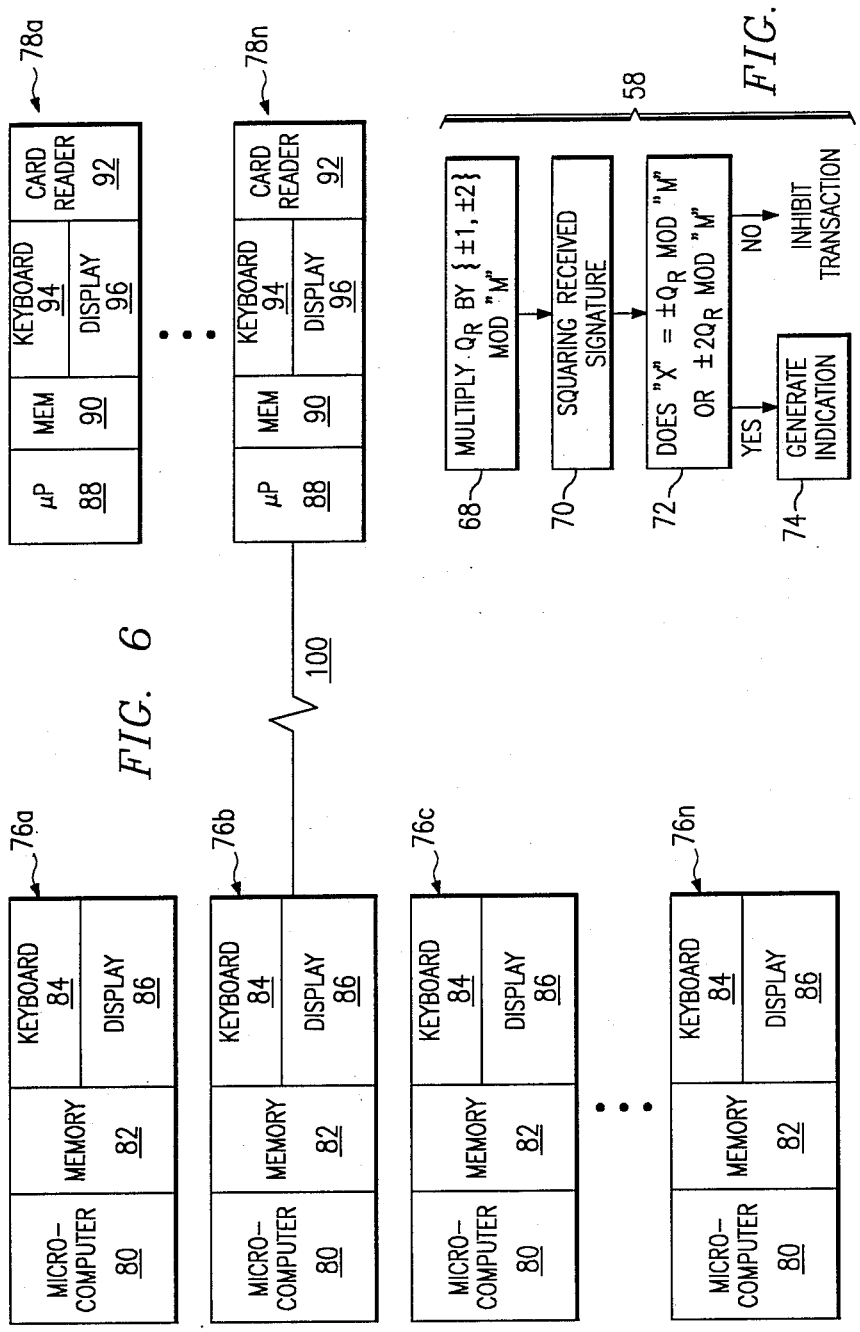

METHOD AND SYSTEM FOR PERSONAL IDENTIFICATION

TECHNICAL FIELD

The present invention relates generally to personal identification schemes and more particularly to a method and system for issuing authorized personal identification cards and for preventing unauthorized use thereof during transaction processing.

BACKGROUND OF THE INVENTION

Password-based protection schemes for credit cards or other personal identification cards are well-known in the prior art. Such cards typically include a memory comprising a magnetic tape or other storage media affixed to the card. They may also include a data processing capability in the form of a microprocessor and an associated control program. In operation, a card issuer initially stores in the memory a personal identification number, i.e., a secret password, as well as a value representing a maximum dollar amount. To effect a transaction, the card is placed in a terminal and the user is required to input his or her password. If the terminal verifies a match between the user-inputted password and the password stored on the card, the transaction is allowed to proceed. The value of the transaction is then subtracted from the value remaining on the card, and the resulting value represents the available user credit.

Techniques have also been described in the prior art for protecting against the illegitimate issuance of credit cards such as the type described above. In U.S. Pat. No. 4,453,074 to Weinstein, each such card has stored therein a code which is the encryption of a concatenation of a user's secret password and a common reference text. The encryption is derived in an initialization terminal through the use of a private key associated with the public key of a public-key cryptosystem key pair. In operation, a cardholder presents his or her card to a transaction terminal. The terminal decrypts the stored code on the card in accordance with the public key of the public-key cryptosystem pair. A transaction is effected only if the stored code decrypts into the user password, inputted on a keyboard by the cardholder, and the common reference text.

While the method described in the Weinstein patent provides an adequate protection scheme for preventing the fraudulent issuance of credit cards, this scheme requires each user to have a secret or "private" password which must be memorized and inputted into the transaction terminal. Weinstein also requires additional circuitry for concatenating the user's secret password with the common reference text. This latter requirement, while purportedly required to insure the integrity of the protection scheme, increases the complexity and the cost of the system.

It would therefore be desirable to provide an improved method for issuing personal identification cards using a public-key cryptosystem in which a "secret" password need not be memorized by the authorized user or concatenated with a common reference text to maintain the system security.

BRIEF SUMMARY OF THE INVENTION

The present invention describes a method and system for issuing authorized personal identification cards and for preventing the unauthorized use thereof using a public-key cryptosystem.

According to one feature of the invention, each authorized user of a card is assigned a password having a portion thereof which is generated from a representation of some non-secret or "public" characteristic of the user. The password is then processed to produce a digital "signature" which, along with the password, is thereafter stored on the card. To authorize a transaction at a transaction terminal, the digital signature from a received card must first be shown to have been generated from the password on the received card. The password is also processed at the transaction terminal to display a representation of the "public" characteristic encoded thereon. The public characteristic is then verified by an operator of the transaction terminal before a transaction is authorized.

It is very difficult to create a valid signature for any personal data without the proper private key, although it is simple for anyone to verify whether or not the signature for a password on the card is authentic, even without the private key. Only a card issuer can thus make a valid card and only a user with matching personal characteristics can use the card.

In the preferred embodiment, the password includes data representing a pictorial representation of a physical characteristic (e.g., the face, fingerprint, voice sample or the like) of the authorized user. Alternatively, or in addition to the pictorial representation data, the password may contain other data pertinent to the user, such as the user's age, address, nationality, security clearance, bank account balance, employer, proof of ownership, or the like. The password may also include one or more codewords, each of the codewords authorizing a specific transaction such as permission to receive certain funds on a certain date, permission to see classified documents, permission to enter into a country on a certain date (i.e., a visa), attestation to perform certain acts, or the like. Although not meant to be limiting, the personal identification card may be a credit card, a driver's license, a passport, a membership card, an age verification card, a bank card, a security clearance card, a corporate identification card or a national identification card.

In the preferred embodiment, a method for issuing an authorized personal identification card comprises the steps of generating the pictorial representation of a physical characteristic of the authorized user, processing the pictorial representation to generate a password, mapping the password with a predetermined function to generate a mapped password, digitally signing the mapped password with a private key of a public-key cryptosystem pair to generate a signature corresponding to the mapped password, encoding the password and the signature with a predetermined function to generate an encoded password/signature, and storing the encoded password/signature on a personal identification card.

To enable an authorized user of the personal identification card to effect a transaction using a transaction terminal, the subject invention describes a method comprising the steps of receiving the personal identification card at the transaction terminal, decoding the encoded password/signature of the received personal identification card to generate a received password and a received signature, mapping the received password with the predetermined function to generate a mapped password for the received personal identification card, and digitally verifying, using the public key of the public-key cryptosystem pair, whether the received signature can be generated from the mapped password for the received personal identification card. If the received signature can be generated from the mapped password using the public key, the method continues by generating an indication that the received signature is valid. A pictorial representation is then generated from the received password, and the pictorial representation and the indication are then displayed on a display of the transaction terminal to enable an operator thereof to verify that the user is authorized to effect a transaction using the personal identification card.

Preferably, the digital signing routine of the method includes the steps of multiplying the mapped password "Q" by each of the four factors $\pm 1$ modulo "M" and $\pm 2$ modulo "M", where $M = P_1 \cdot P_2$. As used herein, "M" refers to the public key of the public-key cryptosystem pair and $(P_1, P_2)$ refers to the private key thereof, where "$P_1$" and "$P_2$" are secret prime numbers which are preselected such that only one of the four values $\pm Q$ mod M and $\pm 2Q$ mod M is a quadratic residue modulo "M". According to the digital signing routine, the four values $\pm Q$ mod M and $\pm 2Q$ mod M are evaluated to determine which of these values is a quadratic residue modulo "M". The square root of the quadratic residue is then computed to generate the signature. Because the square root computation is extremely difficult to carry out without knowing the factorization of the secret prime numbers of the private key, unauthorized third parties are not capable of producing a card "signature" which, when digitally verified at the transaction terminal, can be shown to have been generated from the mapped password on the received personal identification card.

In accordance with yet another feature of the invention, a system for issuing authorized personal identification cards and for preventing unauthorized use thereof includes a plurality of issuing transaction terminals, each of the issuing transaction terminals being uniquely associated with one issuer of personal identification cards. Each issuer is assigned or selects its own public-key cryptosystem key pair which may or may not be different from the public-key cryptosystem key pair of every other issuer in the system. This arrangement, especially suited to a passport control system or the like, enables the operator of a transaction terminal to verify signatures from one or more of the issuers.

According to a further feature of the invention, a unique personal identification card is provided for effecting transactions via at least one transaction terminal. The identification card preferably includes a body portion and a memory within the body portion for storing a password and a signature derived from the password. The password includes a portion thereof which is generated from a pictorial representation of a non-secret characteristic of the authorized user, such as the user's face. The signature is derived from the password with the private key of a public-key cryptosystem pair.

BRIEF DESCRIPTION OF THE DRAWINGS

For a more complete understanding of the present invention and the advantages thereof, reference is now made to the following Description taken in conjunction with the accompanying Drawings in which:

FIG. 1 is a schematic representation of one type of personal identification card according to the invention, the card having a picture of a physical characteristic of an authorized user of the identification card;

FIG. 1A is a diagrammatic representation of a portion of a magnetic stripe of the personal identification card of FIG. 1 showing a "password" generated in part from the picture on the identification card;

FIG. 2 is a general flowchart diagram of the preferred method of the present invention for issuing an authorized personal identification card such as shown in FIG. 1;

FIG. 3 is a detailed flowchart diagram of the digital signing routine of FIG. 2;

FIG. 3A is a flowchart diagram of a routine for selecting the secret prime numbers of the private key $(P_1, P_2)$;

FIG. 4 is a general flowchart diagram of the preferred method of the present invention for preventing unauthorized use of the personal identification card of FIG. 1 which is issued according to the method of FIG. 2;

FIG. 5 is a detailed flowchart diagram of the digital verifying routine of FIG. 4; and FIG. 6 is a block diagram of a representative multi-issuer system according to the present invention.

DETAILED DESCRIPTION

With reference now to the drawings wherein like reference numerals designate like or similar parts or steps, FIG. 1 is a schematic representation of a personal identification card 10 for use according to the present invention for effecting transactions via a transaction terminal. As noted above, the term "personal identification card" according to the present invention is to be read expansively and is deemed to cover credit cards or other commonly known forms of identification such as a passport, a driver's license, a membership card, an age identification card, a security clearance card, a corporate identification card, a national identification card, or the like.

Personal identification card 10 in FIG. 1 is a driver's license. Card 10 includes a body portion 12 having a display 14 and a memory 16. Although not meant to be limiting, the memory 16 is preferably a magnetic stripe or similar media, or an electronic memory such as a PROM, affixed to or embedded in the card in a known manner. The personal identification card may or may not include an integral microprocessor embedded in the body portion. As seen in FIG. 1, the display 14 of the personal identification card 10 supports a pictorial representation 18 of a physical characteristic of the authorized user; e.g., the user's face. Of course, the display 14 may also display pictorial representations of other physical features of the user such as the user's fingerprint or palm print.

Referring now to FIG. 1A, according to the present invention the memory 16 of the personal identification card 10 preferably includes a "password" 20 unique to the authorized user and having a portion 20a thereof which is generated from a representation of some non-secret or "public" characteristic of the user. As used herein, the term "non-secret" refers to the fact that the representation of the authorized user, such as the user's face, is readily ascertainable by viewing and comparing the personal identification card and the authorized user directly. In the preferred embodiment, the section 20a of the password is a digital bitstream representing a digitized version of the pictorial representation 18 on the personal identification card 10.

As also seen in FIG. 1A, the password 20 may include a portion 20b having data representing one or more personal facts about the authorized user such as the user's age, address, nationality, security clearance, employer, bank account balance, eye color, height, weight, mother's maiden name, or any other such information. This information may or may not be public. Moreover, the password 20 may further include a portion 20c having one or more codewords, each of the codewords authorizing a specific transaction such as permission to enter a country on a certain date, permission to receive certain funds on a certain date, permission to review certain classified documents, or one or more other such specific transactions. Of course, the password 20 may include one or more of the predetermined types of data, 20a, 20b, and/or 20c, shown in FIG. 1A.

As also seen in FIG. 1A, the memory 16 of the personal identification card 10 also includes a signature 22, which, as will be described in more detail below, is derived from the password 20 using the private key of a "public-key cryptosystem" key pair. A "public-key cryptosystem" is a well known security scheme which includes two "keys," one key which is public (or at least the key-pair owner does not really care if it becomes public) and one key which is private or non-public. All such public-key cryptosystem pairs include a common feature—the private key cannot be determined from the public key.

Referring now to FIG. 2, a general flowchart diagram is shown of the preferred method of the present invention for issuing an authorized personal identification card 10 such as shown in FIG. 1. At step 30, the card issuer collects the necessary personal data from a card applicant. Although not meant to be limiting, this data preferably includes a pictorial representation of a physical characteristic of the authorized user. For example, the data may include a photograph of the card applicant. At step 32, the photograph, other personal data and/or code authorizations are processed to generate a password as described above in FIG. 1A.

At step 34, the password is mapped with a predetermined one-way function "F" to generate a mapped password "Q" which may have a length substantially less than the length of the password. This "mapping" step is typically required to reduce the length of the digital bitstream comprising the password, especially when a digitized photograph of the authorized user is stored therein. By way of example only, the predetermined one-way function "F" may be any one or more of several well-known i.e., public hashing functions such as one obtainable from the DES scheme or the Goldwasser, Micali & Rivest scheme. Alternatively, the function "F" may be an identity function which simply transfers the password through step 34 without modification. The identity function might be used where the password length is sufficiently smaller than the available storage capability of the memory 16.

At step 36, the method continues to "digitally sign" the mapped password "Q" with a private key $(P_1, P_2)$ of a pubic-key cryptosystem pair to generate a so-called "signature". As will be described in more detail below, in the preferred embodiment "$P_1$" and "$P_2$" are secret prime numbers and the public-key cryptosystem pair includes a public key "M" which is equal to "$P_1 \cdot P_2$". At step 38, the method encodes the password (as opposed to the mapped password) and the signature with an error-correcting code to generate an encoded password/signature. Step 38 insures that the card 10 will be usable even if some of its data is destroyed. At step 40, the encoded password/signature is stored on the personal identification card in the manner substantially as shown in FIG. 1A.

Although not shown in detail in FIG. 2, it should be appreciated that the card issuer may digitally sign one or more digital signatures on the card 10 at one or more different times using different public-key cryptosystem pair keys. The card could then function as a passport with each signature derived from a different cryptosystem key pair corresponding to a different country (i.e., a visa). It may also be desirable in the method of FIG. 2 to include an additional encryption step wherein the password is encrypted with a predetermined function prior to the mapping step and/or where the signature itself is encrypted. This enables the card to carry information which is desired to be maintained highly confidential even if the card were lost or stolen.

Referring now to FIG. 3, a detailed flowchart diagram is shown of the preferred digital signing routine of the present invention. As described above, "M" is the public key of the public-key cryptosystem and $(P_1, P_2)$ is the private key thereof. According to the routine, the secret prime numbers "$P_1$" and "$P_2$" are selected at step 42 such that when the mapped password Q is multiplied by four predetermined factors, $\pm 1$ modulo "M" and $\pm 2$ modulo "M," one and only one of the resulting values $\pm Q$ mod M and $\pm 2Q$ mod M is a quadratic residue modulo "M". The security of the preferred digital signing routine is based primarily on the fact that is it extremely difficult to compute the square root of the quadratic residue modulo "M" without knowing the factorization of $M = P_1 \cdot P_2$.

Referring back to FIG. 3, at step 44 the mapped password "Q" is multiplied by each of the factors $\pm 1$ mod M and $\pm 2$ mod M. The routine continues at step 46, wherein each of the resulting values $\pm Q$ mod M and $\pm 2Q$ mod M are evaluated to locate the quadratic residue mod "M". When this value is located, the routine computes the square root thereof at step 48 to generate the digital signature.

Although not shown in detail, it should be appreciated that the private key may include any number of secret prime numbers $(P_1, P_2, P_3, \ldots P_n)$. Preferably, the secret prime numbers are selected according to the routine shown in FIG. 3A. At step 35, an n-bit random number "$x_1$" is generated. The number of bits "n" needs to be large enough (e.g., 250 bits) such that it is difficult to factor "M". At step 37, $x_1$ is incremented to be congruent to a predetermined value, e.g., "3 mod 8". At step 39, a test is made to determine if $x_1$ is prime. If so, then the routine continues at step 41 by setting $x_1 = P_1$. If $x_1$ is not prime, then $x_1$ is incremented at step 43 (by setting $x_1 = x_1 + 8$) and the routine returns to step 39. Once $P_1$ is selected, the routine continues at step 45 to generate another n-bit random number "$x_2$". At step 47, $x_2$ is incremented to be congruent with a second predetermined value, e.g., "7 mod 8". At step 49, a test is made to determine if $x_2$ is prime. If so, then the routine continues at step 51 by setting $x_2 = P_2$. If $x_2$ is not prime, then $x_2$ is incremented at step 53 (by setting $x_2 = x_2 + 8$) and the routine returns to step 49. Once $P_2$ is selected, the public key "M" is set equal to $P_1 \cdot P_2$ at step 55.

It is also desirable to store $P_1$ and $P_2$ in the issuing terminal responsible for computing signatures. Moreover, it is possible to distribute the private key $(P_1, P_2)$ from one terminal to another without any person being able to discern the key by using another public-key cryptosystem pair (for which the private key is known only to the receiving terminal). Moreover, while the digital signing routine of FIG. 3 is preferred, other schemes, such as RSA, the Goldwasser, Micali & Rivest scheme and/or the Rabin scheme, may be use. Such schemes may also require knowledge of the public key, although the routine of FIG. 3 does not. In any case, the process of generating the "signature" is fast if the private key is known but is prohibitively slow otherwise. Any attempt to issue counterfeit cards is complicated further by the use of a one-way function "F" to hash the password into the mapped password "Q". In this way, it becomes virtually impossible for a counterfeiter to mount a chosen-text attack on the card generation scheme even if the counterfeiter could somehow obtain signatures for fake personal data.

Referring now to FIG. 4, a general flowchart diagram is shown of a preferred method for preventing unauthorized use of the personal identification card 10 issued according to the routines of FIGS. 2-3. At step 50, the personal identification card is received at a transaction terminal. At step 52, the encoded password/signature is decoded to generate a received password and a received signature. Preferably, the method includes a step 54 wherein errors in the received password and received signature are corrected in accordance with well-known techniques. At step 56, the received password is mapped, with the same predetermined function "F" used at the issuing terminal, to generate a mapped password "$Q_R$" for the received personal identification card.

The routine then continues at step 58 to verify that the received signature is "valid". In particular, the method digitally verifies, using the public key of the public-key cryptosystem pair, whether the received signature can be generated from the mapped password "$Q_R$". If so, the method continues at step 60 to generate an indication that the received signature is valid. At step 62, a representation is generated from data in the received password. This representation will be a picture if the original password stored on the card included a digitized photograph of the authorized cardholder. Of course, step 62 can be performed in parallel with steps 58 and 60 so that the picture is immediately displayed while the signature verification takes place. Referring back to FIG. 4, at step 64, the method displays either the pictorial representation or the indication, or both, on a display of the transaction terminal. This display is then verified by an operator of the terminal at step 66 to insure that the cardholder is authorized to effect a transaction.

It should be appreciated that the personal identification card generated according to the method of FIG. 2 can be used in any situation requiring user identification. For example, and not by way of limitation, the authorized user can present the card to an authorized salesperson for charging a purchase. The salesperson would enter the card into the transaction terminal which is capable of reading the data from the card's memory, verifying that the (digital) signature on the card is valid, and displaying on the display screen information derived from the password. The salesperson an therefore be assured that the cardholder's identity is as claimed and proceed with the charge.

Referring now to FIG. 5, a detailed flowchart is shown of the preferred digital verification routine of FIG. 3. At step 68, the routine multiplies the mapped password "$Q_R$" from the received personal identification card by each of the factors $\pm 1$ mod M and $\pm 2$ mod M. The method continues at step 70 by squaring modulo "M" the received signature to generate a value "X". At step 72, a test is made to determine whether "X" equals either $\pm Q_R$ mod M or $\pm 2Q_R$ mod M. If so, the routine continues at step 74 to generate the indication that the received signature is valid. If "X" does not equal any one of these four factors, the signature is invalid and the transaction is inhibited.

Of course, the method and system of the present invention is easily adaptable to a multi-issuer scenario where several parties desire to issue cards using different cryptosystem pairs, but where verifiers (i.e., operators of transaction terminals) need to authenticate a card from any of the issuers. This can be accomplished by encoding the public key used by each issuer into each transaction terminal and then requiring the operator thereof to enter into the terminal both the identity of the issuer along with the card itself; alternatively, the identity of the card issuer can be encoded on the card. This type of system is shown in FIG. 6, wherein a plurality of issuing terminals 76a . . . 76n are provided for one or more independent issuers of authorized personal identification cards. Each of the independent issuers is assigned or selects a distinctive public-key cryptosystem pair unknown to the other issuers. As noted above, the public key of each such pair is then encoded into each of the one or more transaction terminals 78a . . . 78n which are shared by all of the issuers.

The system of FIG. 6 is useful for passport control, national identification cards, or multi-company credit cards, although such applications are not meant to be limiting. In operation of a passport system, for example, each country would have complete autonomy over the personal identification cards it issues, but a single transaction terminal would be used to authenticate the signature (which could include a visa) of any country.

Although not described in detail, it can be appreciated by those skilled in the art that the method and system of the present invention can be readily implemented with preexisting hardware and software. In the preferred embodiment, and as shown in FIG. 6, each of the issuing terminals 76 includes a microcomputer 80 and associated memory devices 82 for storing operating programs and application programs for carrying out the method steps of FIG. 2. Input/output devices, such as a keyboard 84 and display 86, are provided for interfacing the terminal to the card issuer. Of course, one or more of the method steps (e.g., the digital signing step, the mapping step and the encoding step) can be implemented in either gate array logic chips or software. Likewise, each of the transaction terminals 78 preferably includes a microprocessor 88, associated memory 90, and appropriate input/output devices such as car-dreader 92, keyboard 94 and display 96.

While the above discussion relates specifically to protection schemes for personal identification cards, it should be appreciated that the password/signature security routines of the present invention may also be used where the personal data is transmitted over a communications channel as opposed to being stored on an identification card per se. Returning back to FIG. 6, this aspect of the invention is achieved by providing a communications channel 100, e.g., a telephone link via modems, between an issuing terminal 76b and a transaction terminal 78a.

In operation, the method steps of FIG. 2 would be the same as previously described except that step 40 is deleted and a step of transmitting the encoded password/signature over the communications channel 100 is substituted therefor. Likewise, step 50 of the verification routine in FIG. 4 is deleted and is substituted with a step whereby the information provided over the communications channel 100 is received at the transaction terminal and then processed according to the remainder of the steps in FIG. 4. In this way, the password/signature method is used for personal identification where the medium for supporting and transmitting the password and the signature is the communications channel itself rather than the identification card.

Although the invention has been described and illustrated in detail, the same is by way of example only and should not be taken by way of limitation. The spirit and scope of the present invention are limited only by the terms of the appended claims.

I claim:

1. A method for enabling an authorized user of a personal identification card to effect a transaction using a transaction terminal, comprising the steps of:
   generating a first data string having a portion thereof which is derived from a physical characteristic of the authorized user and need not be retained secret;
   mapping the first data string using a predetermined function F to generate a second data string Q having a length substantially less than the length of the first data string;
   digitally signing the second data string with a private key of a public-key cryptosystem pair to generate a signature corresponding to the second data string, the public-key cryptosystem pair also having a public key M;
   encoding the first data string and the signature to generate an encoded first data string/signature;
   storing the encoded first data string/signature on the personal identification card;
   receiving the personal identification card at the transaction terminal;
   decoding the encoded first data string/signature on the received personal identification card to generate the first data string and a received signature;
   mapping the first data string with the predetermined function F to generate the second data string;
   digitally verifying, using the public key M of the public-key cryptosystem pair, whether the received signature can be generated from the second data string;
   if the received signature can be generated from the second data string using the public key, generating an indication that the received signature is valid;
   generating a representation from the first data string; and
   displaying the representation and the indication on a display of the transaction terminal to enable an operator thereof to verify that the user is authorized to effect a transaction using the personal identification card.

2. The method for enabling an authorized user of a personal identification card to effect a transaction as described in claim 1 wherein the first data string includes data representing a pictorial representation of the physical characteristic of the authorized user.

3. The method for enabling an authorized user of a personal identification card to effect a transaction as described in claim 1 wherein the first data string includes data representing one or more personal facts about the authorized user.

4. The method for enabling an authorized user of a personal identification card to effect a transaction as described in claim 1 wherein the first data string includes one or more codewords, each of the codewords authorizing a specific transaction.

5. The method for enabling an authorized user of a personal identification card to effect a transaction as described in claim 1 wherein the first data string includes data representing a pictorial representation of the physical characteristics of the authorized user, data representing one or more personal facts about the authorized user, and at least one codeword authorizing a specific transaction using the personal identification card.

6. The method for enabling an authorized user of a personal identification card to effect a transaction as described n claim 1 wherein the predetermined function F is an identity function.

7. The method for enabling an authorized user of a personal identification card to effect a transaction as described in claim 1 wherein the predetermined function F is a hashing function based on a DES scheme.

8. The method for enabling an authorized user of a personal identification card to effect a transaction as described in claim 1 wherein the encoding step includes the step of:
   encoding the first data string and the signature with an error-correcting code.

9. The method for enabling an authorized user of a personal identification card to effect a transaction as described in claim 1 wherein the decoding step includes the step of:
   correcting errors in the first data string and in the received signature decoded from the encoded first data string/signature.

10. The method for enabling an authorized user of a personal identification card to effect a transaction as described in claim 1 wherein the digital signing step includes the steps of:
    multiplying the second data string by each of the factors $\pm 1 \bmod M$ and $\pm 2 \bmod M$;
    determining which of the four values $\pm Q \bmod M$ and $\pm 2Q \bmod M$ is a quadratic residue modulo M, where M equals a product of $P_1$ multiplied by $P_2$ and $P_1$ and $P_2$ are secret prime numbers which are preselected such that only one of the four values $\pm Q \bmod M$ and $\pm 2Q \bmod M$ is a quadratic residue modulo M; and
    computing the square root of the quadratic residue to generate the signature.

11. The method for enabling an authorized user of a personal identification card to effect a transaction as described in claim 10 wherein the digitally verifying step includes the steps of:
    multiplying the second data string by each of the factors $\pm 1 \bmod M$ and $\pm 2 \bmod M$;
    squaring modulo the received signature to generate a value X;
    determining whether X equals either $\pm Q \bmod M$ or $\pm 2Q \bmod M$; and
    if X equals either $\pm Q \bmod M$ or $\pm 2Q \bmod M$, generating the indication that the received signature is valid.

12. A method for issuing a personal identification card for an authorized user of the personal identification card, comprising the steps of:
    generating a pictorial representation of a physical characteristic of the authorized user;

processing the pictorial representation to generate a first data string;

mapping the first data string with a predetermined one-way function to generate a second data string Q having a length substantially less than the length of the first data string;

digitally signing the second data string Q with a private key of a first public-key cryptosystem pair to generate a first signature, where $P_1$ and $P_2$ are secret prime numbers and the first public-key cryptosystem pair also includes a public key M which is equal to a product of $P_1$ multiplied by $P_2$;

encoding the first data string and the first signature with an error-correcting code to generate an encoded first data string/signature; and storing the encoded first data string/signature on the personal identification card.

13. The method for issuing a personal identification card as described in claim 12 further including the steps of:

digitally signing the second data string with a private key of a second public-key cryptosystem pair to generate a second signature; and encoding the second signature along with the first data string and the first signature.

14. The method for issuing a personal identification card as described in claim 12 further including the step of:

augmenting the first data string to include data representing one or more personal facts about the authorized user.

15. The method for issuing a personal identification card as described in claim 12 further including the step of:

augmenting the first data string to include one or more codewords, each of said codewords authorizing a specific transaction using the personal identification card.

16. The method for issuing a personal identification card as described in claim 15 wherein the personal identification card is a passport and each of the cryptosystem pairs corresponds to a different country.

17. The method for issuing a personal identification card as described in claim 12 wherein the digital signing step includes the steps of:

multiplying the second data string by each of the predetermined factors $\pm 1 \mod M$ and $\pm 2 \mod M$;

determining which of the values $\pm Q \mod M$ and $\pm 2Q \mod M$ is a quadratic residue modulo M, where the secret prime numbers $P_1$ and $P_2$ are preselected such that only one of the four values $\pm Q \mod M$ and $\pm 2Q \mod M$ is a quadratic residue modulo M; and computing the square root of the quadratic residue modulo M to generate the first signature.

18. The method for issuing a personal identification card as described in claim 12 further including the step of:

encrypting the first data string with a predetermined function prior to the mapping step.

19. A system for issuing authorized personal identification cards and for preventing unauthorized use thereof, comprising:

issuing terminal means for issuing a plurality of personal identification cards, each of said cards having stored therein a first data string with a portion thereof derived from a physical characteristic of an authorized user of the card, each of said cards also having stored therein a signature derived from a second data string using a private key of a public-key cryptosystem pair, the public-key cryptosystem pair also having a public key, the second data string being derived from the first data string using a predetermined one-way function and having a length substantially less than the length of the first data string; and transaction terminal means including at least one transaction terminal for receiving a personal identification card offered to effect a transaction using the transaction terminal, the personal identification card having the first data string and a received signature stored therein, wherein the transaction terminal comprises means, using the public key of the public-key cryptosystem pair, for verifying that the received signature can be generated from the first data string, means responsive to the verifying means for generating a representation from the first data string, and means for displaying the representation and an indication of whether the received signature can be generated from the first data string to enable an operator of the transaction terminal to verify that the user of the offered personal identification card is authorized to effect a transaction.

20. The system as described in claim 19 wherein the issuing terminal means includes at least one issuing terminal for one or more independent issuers of authorized personal identification cards, each of the independent issuers having a distinctive public-key cryptosystem pair unknown to the other issuers.

21. A system for allowing authorizing users of personal identification cards to effect transactions via at least one transaction terminal comprising a plurality of said cards each having stored therein a signature which is the digital signature of a second data string, the second data string being derived from a first data string derived from a physical characteristic associated with a respective user, the second data string derived from the first data string using a predetermined one-way function and having a length substantially less than the length of the first data string, the signature stored in each of said cards having been derived with the same private key of a public-key cryptosystem pair also having a public key; and at least one transaction terminal having means for controlling (1) the retrieval of the first data string and the signature stored in the inserted card, (2) the digital verification of the signature with the use of the public key of the public-key cryptosystem pair, (3) the generation of a pictorial representation from the first data string, and (4) the effecting of a transaction only if the signature is verified and the pictorial representation matches the user.

22. A terminal for initializing personal identification cards, to be used with at least one transaction terminal, each card having a memory therein, comprising means for assigning a first data string having a portion thereof which is derived from a physical characteristic of a user whose card is to be initialized, means for mapping the first data string with a predetermined one-way function to generate a second data string having a length substantially less than the length of the first data string, means for deriving a digital signature from the second data string, the signature for each user being derived with use of a private key of a public-key cryptosystem pair also having a public key, and means for controlling the storing in a user card of the respective derived digital signature.

23. A personal identification card, for use in effecting transactions via at least one transaction terminal, comprising a body portion, a memory within said body portion for storing a signature, said signature being the digital signature of a second data string derived from a first data string having at least a portion thereof being derived from a physical characteristic of a respective card user, the second data string being derived from the first data string using a predetermined one-way function and having a length substantially less than the length of the first data string, wherein said signature is derived from the second data string with the private key of a public-key cryptosystem pair.

24. A method for personal identification, comprising the steps of:

generating a first data string having a portion thereof which is derived from a physical characteristic of a user and need not be retained secret;

mapping the first data string using a predetermined function to generate a second data string;

digitally signing the second data string with a private key of a public-key cryptosystem pair to generate a signature corresponding to the second data string, the public-key cryptosystem pair also including a public key;

encoding the first data string and the signature to generate an encoded first data string/signature;

transmitting the encoded first data string/signature over a communications channel;

receiving the encoded first data string/signature at a transaction terminal;

decoding the received encoded first data string/signature to generate the first data string and a received signature;

mapping the first data string with the predetermined function to generate the second data string;

digitally verifying, using the public key of the public-key cryptosystem pair, whether the received signature can be generated from the second data string;

if the received signature can be generated from the second data string using the public key, generating an indication that the received signature is valid;

generating a representation from the first data string; and displaying the representation and the indication on a display of the transaction terminal to enable an operator thereof to verify that the user is authorized to effect a transaction.

25. A method for enabling an authorized user of a personal identification card to effect a transaction using a transaction terminal, comprising the steps of:

generating a first data string having a portion thereof which is derived from a physical characteristic of the authorized user and need not be retained secret;

digitally signing the first data string with a private key of a public-key cryptosystem pair to generate a signature corresponding to the first data string, the public-key cryptosystem pair also having a public key M;

storing the first data string and the signature on the personal identification card;

receiving the personal identification card at the transaction terminal;

digitally verifying, using the public key M of the public-key cryptosystem pair, whether the signature on the personal identification card received at the transaction terminal can be generated from the first data string;

if the signature can be generated from the first data string using the public key, generating an indication that the signature is valid;

generating a representation from the first data string; and displaying the representation and the indication on a display of the transaction terminal to enable an operator thereof to verify that the user is authorized to effect a transaction using the personal identification card.

26. A method for enabling an authorized user of a personal identification card to effect a transaction using a transaction terminal, the personal identification card having stored therein a first data string having a portion thereof which is derived from a physical characteristic of the authorized user and need not be retained secret, and a signature of the first data string derived from a private key of a public-key cryptosystem pair, the public-key cryptosystem pair also having a public key M, comprising the steps of:

receiving the personal identification card at the transaction terminal;

digitally verifying, using the public key M of the public-key cryptosystem pair, whether the signature on the personal identification card received at the transaction terminal an be generated from the first data string;

if the signature can be generated from the first data string using the public key, generating an indication that the signature is valid;

generating a representation from the first data string; and displaying the representation and the indication on a display of the transaction terminal to enable an operator thereof to verify that the user is authorized to effect a transaction using the personal identification card.

* * * * *